(12) United States Patent
Liu et al.

(10) Patent No.: US 12,332,989 B2
(45) Date of Patent: Jun. 17, 2025

(54) AUTHENTICATING USAGE DATA FOR PROCESSING BY MACHINE LEARNING MODELS

(71) Applicant: Dell Products L.P., Round Rock, TX (US)

(72) Inventors: Jinpeng Liu, Shanghai (CN); Tianxiang Chen, Shanghai (CN); Sarah Evans, Parker, CO (US); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 188 days.

(21) Appl. No.: 17/967,220

(22) Filed: Oct. 17, 2022

(65) Prior Publication Data

US 2024/0126859 A1    Apr. 18, 2024

(51) Int. Cl.
*G06F 21/33* (2013.01)

(52) U.S. Cl.
CPC .................... *G06F 21/33* (2013.01)

(58) Field of Classification Search
None
See application file for complete search history.

(56) References Cited

U.S. PATENT DOCUMENTS

| | | | | |
|---|---|---|---|---|
| 6,986,052 B1 * | 1/2006 | Mittal | ............ | G06F 21/602 713/189 |
| 8,914,629 B2 * | 12/2014 | Rubin | ............ | H04L 63/0823 713/157 |
| 9,471,367 B1 * | 10/2016 | Hu | ............ | G06F 9/4401 |
| 12,088,568 B2 * | 9/2024 | Oberhauser | ............ | H04L 9/3239 |
| 2005/0022063 A1 * | 1/2005 | Grebenev | ............ | G06F 11/3612 714/38.1 |
| 2005/0268115 A1 * | 12/2005 | Barde | ............ | H04L 9/3265 713/189 |

(Continued)

OTHER PUBLICATIONS

"Dell Optimizer Version 3.1 User's Guide", Dell Inc., available at: https://dl.dell.com/content/manual19335022-dell-optimizer-version-3-1-user-s-guide.pdf?language=en-us&ps=true (last accessed Oct. 17, 2022), Sep. 4, 2022.

(Continued)

*Primary Examiner* — Kaveh Abrishamkar
(74) *Attorney, Agent, or Firm* — Ryan, Mason & Lewis, LLP

(57) ABSTRACT

Methods, apparatus, and processor-readable storage media for authenticating usage data for processing by machine learning models are provided herein. An example method includes receiving, by a machine learning application installed in a user space of an operating system of a user device, a message from a software component, wherein the software component is: configured to collect usage data associated with the user device; signed with using private key corresponding to a digital certificate by an application installed on the user device; and deployed in a kernel space of the operating system, and wherein the message comprises usage data signed using the private key; authenticating, by the machine learning application, the usage data based on a public key corresponding to the digital certificate; and processing, by the machine learning application in response to a result of the authenticating, at least a portion of the authenticated usage data.

20 Claims, 6 Drawing Sheets

(56) References Cited

U.S. PATENT DOCUMENTS

| | | | | |
|---|---|---|---|---|
| 2012/0131380 A1* | 5/2012 | Horman | ............... | G06F 11/1415 |
| | | | | 711/170 |
| 2015/0113618 A1* | 4/2015 | Sinha | ....................... | G06F 21/44 |
| | | | | 726/6 |
| 2018/0212778 A1* | 7/2018 | Novak | ................ | H04L 63/0435 |
| 2020/0218821 A1* | 7/2020 | Liu | ..................... | H04L 63/0442 |
| 2020/0242711 A1* | 7/2020 | Cao | ....................... | H04L 9/0894 |
| 2021/0226951 A1* | 7/2021 | Goldstein | ............... | H04L 63/20 |
| 2021/0334186 A1* | 10/2021 | Chen | ....................... | H04L 43/20 |
| 2022/0075667 A1* | 3/2022 | Pany | ................... | G06F 11/3438 |
| 2023/0061057 A1* | 3/2023 | Laing | ........................ | H04L 9/30 |
| 2023/0289250 A1* | 9/2023 | Panikkar | ............. | G06F 11/3055 |

OTHER PUBLICATIONS

Hudek, Ted, "Trusted Root Certification Authorities Certificate Store", Microsoft Corporation, available at: https://learn.microsoft.com/en-us/windows-hardware/drivers/install/trusted-root-certification-authorities-certificate-store (last accessed Oct. 17, 2022), Dec. 14, 2021.

Goodfellow, Ian, et al. "Attacking Machine Learning with Adversarial Examples", OpenAI, https://openai.com/blog/adversarial-example-research/ (last accessed Oct. 17, 2022), Feb. 24, 2017.

* cited by examiner

AUTHENTICATING USAGE DATA FOR PROCESSING BY MACHINE LEARNING MODELS

FIELD

The field relates generally to information processing systems, and more particularly to securing data processed by such systems.

BACKGROUND

A machine learning (ML) model generally refers to a computer-implemented process that is trained on historical data to make a prediction or decision based on one or more inputs. ML models are used in a variety of technologies, including self-driving cars, computer vision, natural language processing, and automated fraud detection, for example.

SUMMARY

Illustrative embodiments of the disclosure provide techniques for authenticating usage data for processing by machine learning models. An exemplary computer-implemented method includes receiving, by at least one machine learning application installed in a user space of an operating system of a user device, a message from a software component, wherein the software component is: (i) configured to collect usage data associated with the user device, (ii) signed, by an application installed on the user device, using a private key corresponding to a digital certificate, and (iii) deployed at least in part in a kernel space of the operating system based at least in part on an evaluation of the digital certificate, and wherein the message comprises usage data collected by the software component signed using the private key corresponding to the digital certificate; authenticating, by the at least one machine learning application, the usage data based at least in part on a public key corresponding to the digital certificate; and processing, by the at least one machine learning application in response to a result of the authenticating, at least a portion of the authenticated usage data.

Illustrative embodiments can provide significant advantages relative to conventional security techniques for machine learning systems. For example, technical challenges associated with securing machine learning systems are mitigated in one or more embodiments through a process that authenticates input data and software components that collect the input data to prevent tampered data from being processed by one or more machine learning models.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

An adversarial example attack refers to a type of attack that can be used against a machine learning system. Generally, an adversarial example attack includes designing one or more inputs (referred to as adversarial examples) that cause a machine learning system to make a mistake. For example, an adversarial example for an image classification model can include making perturbations to a real image (which are often imperceptible to the user) that cause the model to misclassify the image. Machine learning systems are increasingly being deployed to perform a variety of tasks on different systems, which increases the threat of such attacks.

By way of example, consider a machine learning system, related to a given system, that is trained to improve a performance of the given system based on collected usage data associated with the given system. An adversarial example attack could be carried out by installing malware on the given system that: (i) tampers with how the usage data is obtained, or (ii) impersonates a software component that collects the usage data so that the machine learning system is provided with fake input. This can cause the machine learning system to shut down one or more hardware components and/or to restart one or more applications, for example. In some situations, such issues can cause a denial-of-service (DoS) condition, where the given system at least temporarily becomes unusable.

Conventional approaches to defending against such attacks include using software detectors to identify adversarial examples. Such detectors are generally designed for image classification models where there is a strong correlation between pixels, but they are not as effective when the correlation among inputs is weaker (e.g., between usage data metrics). Also, conventional approaches often fail as the attacks become more sophisticated.

One or more embodiments described herein include techniques for defending against adversarial example attacks, as well as other forms of attacks, by authenticating input data of machine learning models and for authenticating software components that collect the input data.

Figure 1:
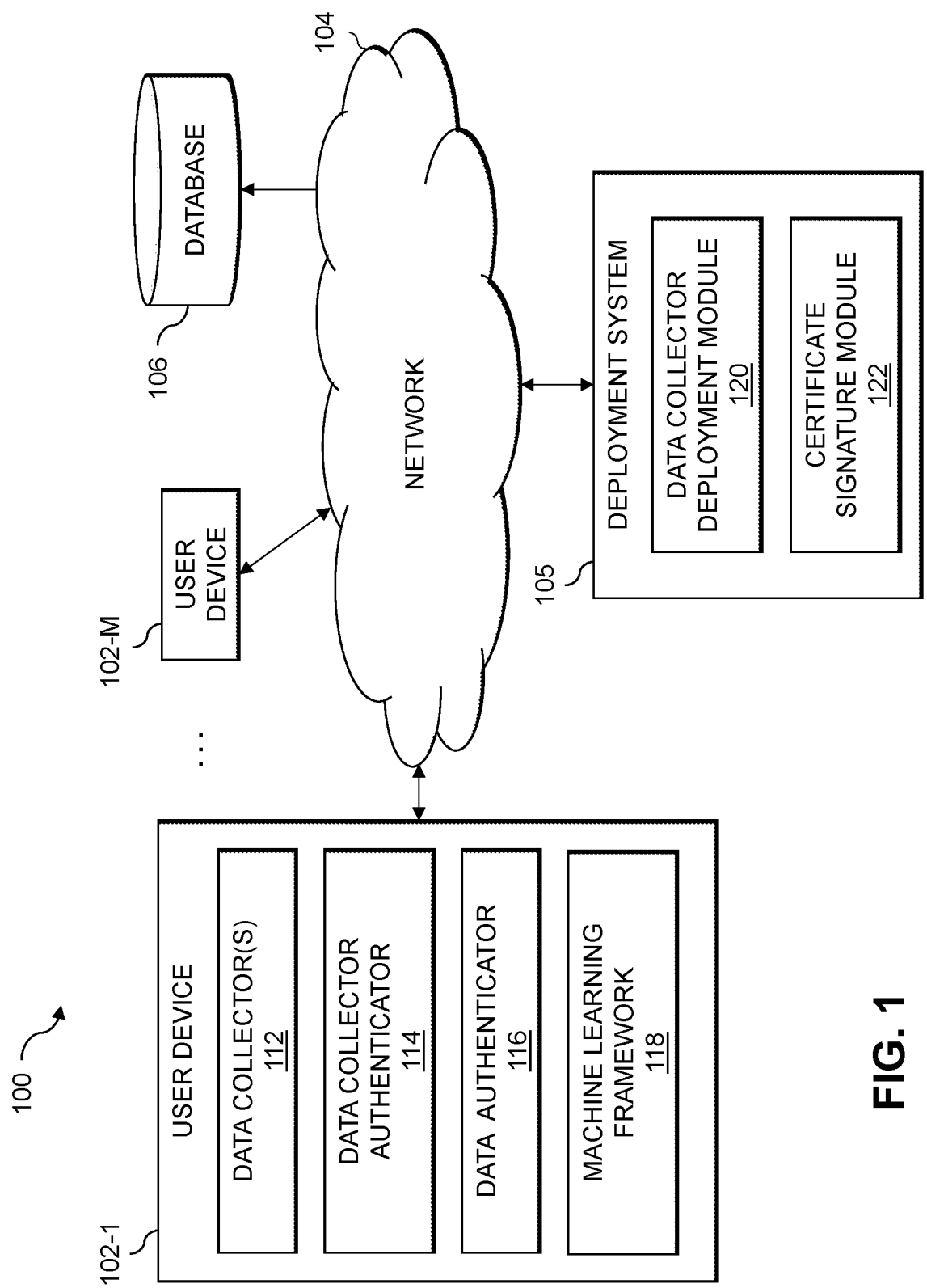
FIG. 1 shows an information processing system configured for authenticating usage data for processing by machine learning models in an illustrative embodiment.

FIG. 1 shows a computer network (also referred to herein as an information processing system) 100 configured for authenticating usage data for processing by machine learning models in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a deployment system 105.

The user devices 102 may comprise, for example, servers and/or portions of one or more server systems, as well as devices such as edge devices, storage appliances, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the user devices 102 and/or the deployment system 105 can have at least one associated database 106 configured to store data pertaining to, for example, digital certificates and/or system usage data.

An example database 106, such as depicted in the present embodiment, can be implemented using one or more storage systems associated with the user devices 102 and/or the deployment system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the deployment system 105 are one or more input-output devices, which illustratively comprise keyboards, displays or other types of input-output devices in any combination. Such input-output devices can be used, for example, to support one or more user interfaces to the deployment system 105, as well as to support communication between deployment system 105 and other related systems and devices not explicitly shown. At least some of the user devices 102 can also implement one or more input-output devices in a similar manner as the deployment system 105.

Additionally, each of the user devices 102 and/or the deployment system 105 in the FIG. 1 embodiment are assumed to be implemented using at least one processing device. Each such processing device generally comprises at least one processor and an associated memory, and implements one or more functional modules for controlling certain features of the user devices 102 and/or the deployment system 105.

More particularly, each user device 102 and/or the deployment system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows communication among each user device 102 and/or the deployment system 105 over the network 104, and illustratively comprises one or more conventional transceivers.

In the example shown in FIG. 1, user device 102-1 further comprises at least one data collector 112, a data collector authenticator 114, a data authenticator 116, and machine learning framework 118; and the deployment system 105 further comprises a data collector deployment module 120 and a certificate signature module 122. One or more of the other user devices 102 can also include elements 112, 114, 116, and 118 (not explicitly shown in FIG. 1).

Generally, the at least one data collector 112 is configured to collect data for hardware and/or software associated with the user device 102-1. In some embodiments, the at least one data collector 112 can be executed within a kernel space of an operating system. The data collector authenticator 114 authenticates the at least one data collector 112 based on a digital certificate, as explained in more detail elsewhere herein. The data authenticator 116 verifies the integrity of the data collected by the at least one data collector 112, as explained in more detail in conjunction FIG. 3, for example.

The machine learning framework 118 can be configured to initiate and/or perform one or more actions by processing data obtained from the at least one data collector 112. As a non-limiting example, the machine learning framework 118 can correspond to software that improves the functionality of the user device 102-1 based at least in part on one or more machine learning models that process the hardware and/or software usage data collected by the at least one data collector 112. For example, the machine learning framework 118 can automatically make one or more adjustments to improve the performance of the user device 102-1. The adjustments can include, for example, adjusting resource allocations, stopping or starting one or more applications, and/or performing a system restart. Alternatively, or additionally, the adjustments can improve the usability of the user device 102-1 for a given user, such as by automatically customizing application settings, battery settings, security settings, and/or audio settings. In some embodiments, the machine learning framework 118 can be implemented on a user space of the operating system. It is to be appreciated that the machine learning framework 118 is to be broadly construed so as to encompass, for example, one or more additional software applications installed on the user device 102.

In some embodiments, update software is optionally preinstalled on the user device 102-1. The update software can be used to obtain the at least one data collector 112 from the data collector deployment module 120 of the deployment system 105. As an example, the update software can be preinstalled by a manufacturer and/or distributor associated with the deployment system 105 and the user device 102-1. The certificate signature module 122 can digitally sign the update software with a root certificate when the update software is installed. The root certificate can then be used by the data collector authenticator 114 to authenticate the data collector 112, as explained in more detail elsewhere herein.

It is to be appreciated that this particular arrangement of elements 112, 114, 116 and 118 illustrated in the user device 102-1 and elements 120 and 122 illustrated in the deployment system 105 of the FIG. 1 embodiment is presented by way of example only, and alternative arrangements can be used in other embodiments. For example, the functionality associated with the elements 112, 114, 116 and 118 and/or elements 120 and 122 in other embodiments can be combined into a single module, or separated across a larger number of modules. As another example, multiple distinct processors can be used to implement different ones of the elements 112, 114, 116 and 118 and/or elements 120 and 122 or portions thereof.

At least portions of elements 112, 114, 116, 118 and/or elements 120 and 122 may be implemented at least in part in the form of software that is stored in memory and executed by a processor.

It is to be understood that the particular set of elements shown in FIG. 1 for the deployment system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the deployment system 105, at least one of the user devices 102, and database(s) 106 can be on and/or part of the same processing platform.

An exemplary process utilizing elements 112, 114, 116 and 118 of an example user device in computer network 100 will be described in more detail with reference to, for example, the flow diagram of FIG. 4.

Figure 2:
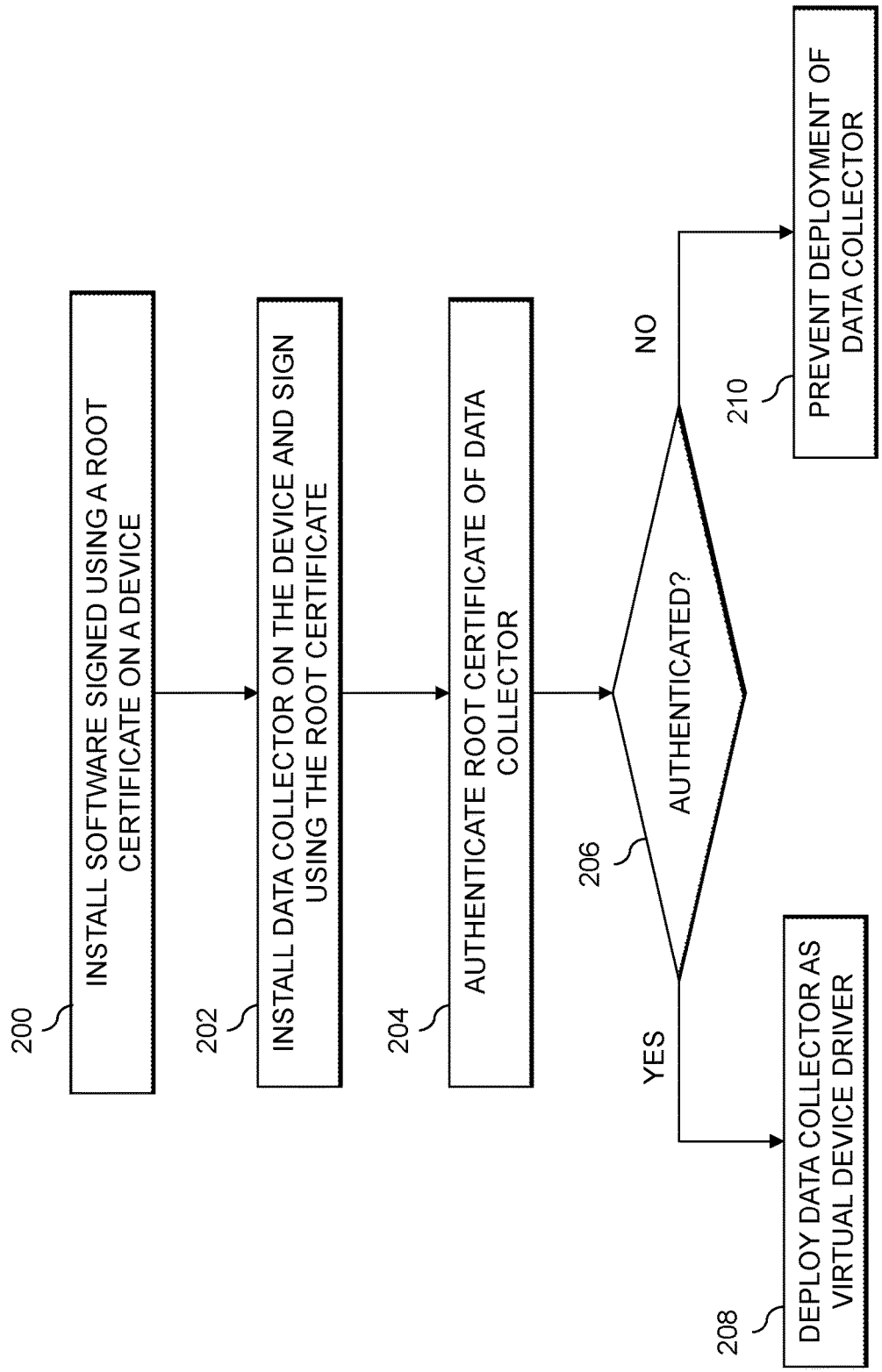
FIG. 2 shows a data collector authentication process in an illustrative embodiment.

FIG. 2 shows a data collector authentication process in an illustrative embodiment. Step 200 includes installing software that is signed using a root certificate on a device. Optionally, the software can be preinstalled on the device (e.g., user device 102-1) and signed using a private key corresponding to the root certificate (e.g., by a manufacturer or distributor) prior to providing the device to a user.

Step 202 includes installing a data collector on the device and signing it using the root certificate. For example, the data collector can be signed by the software from step 200 using the private key of the same root certificate. Step 204 includes authenticating the root certificate of the data collector. For example, an operating system on the device can track a chain of the root certificate. In some embodiments, the root certificate of the data collector can be stored in a trusted certificate database of the operating system (e.g., a Windows Certificate Database). It is to be appreciated that, in some embodiments, signing the data collector may include signing a designated portion of the data collector and/or signing a hash value associated with the data collector, as non-limiting examples.

Step 206 includes a test that checks whether the root certificate is authenticated. If yes, then step 208 includes deploying the data collector as a virtual device driver. For example, the virtual device driver can be deployed in a kernel space of the operating system. Accordingly, the operating system kernel can verify the integrity of the virtual device drive using the signature. If the data collector is not authenticated, then step 210 includes preventing the data collector from being deployed.

The process in FIG. 2, for example, can verify that the data collector that is deployed in the kernel space has not been tampered with based at least in part on the certificate that is stored in the trusted certificate database.

Figure 3:
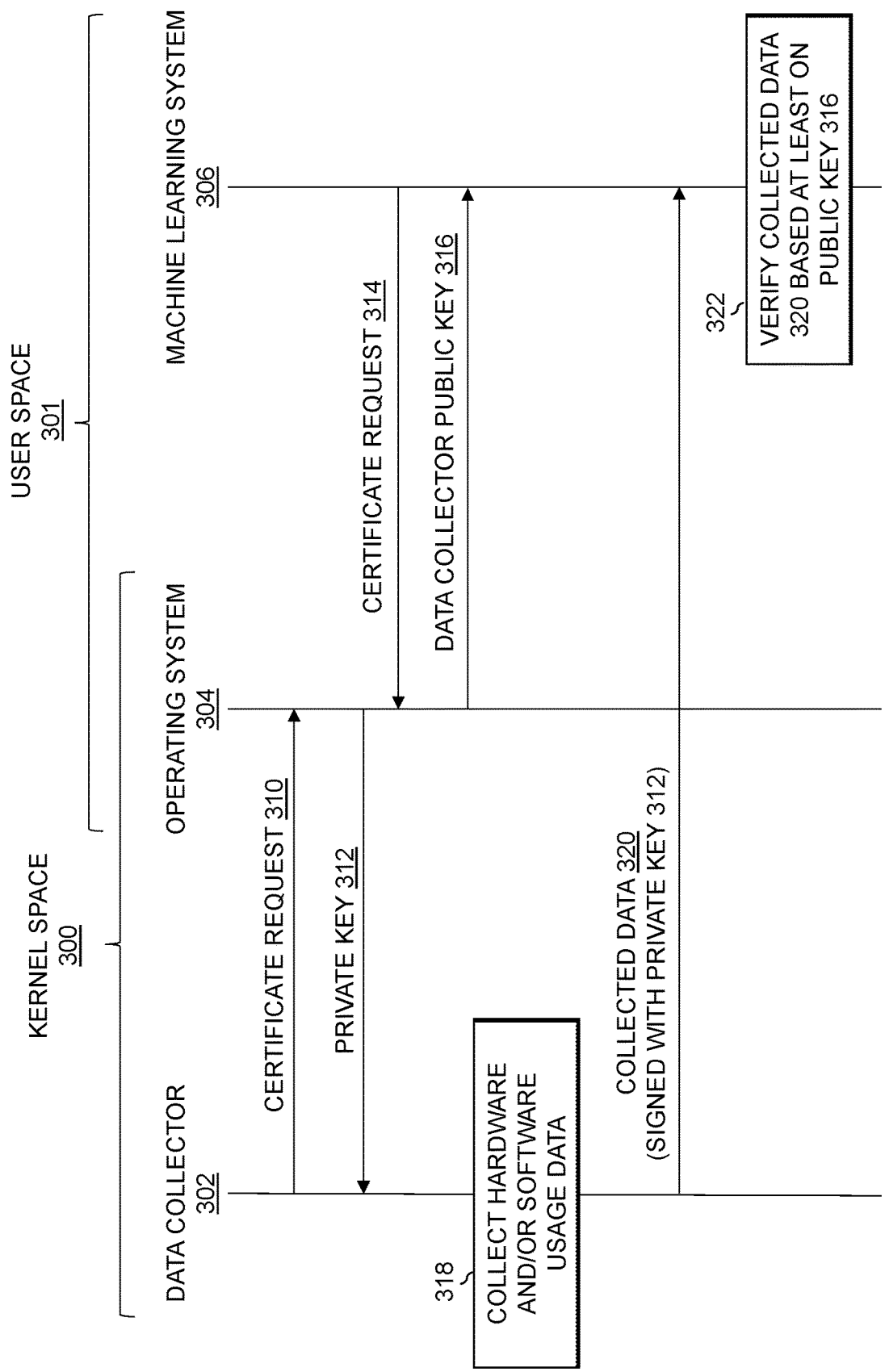
FIG. 3 is a communication diagram for authenticating usage data in an illustrative embodiment.

Referring now to FIG. 3, this figure shows a communication diagram for authenticating usage data in an illustrative embodiment. In this example, it is assumed that a data collector 302 is installed in a kernel space 300 of an operating system 304 (e.g., based on the process described in conjunction with FIG. 2) of a device.

The data collector 302 sends a certificate request 310 to the operating system 304, and in response, the operating system 304 sends the data collector 302 a private key 312.

A machine learning system 306 running in a user space 301 of the operating system 304 sends a certificate request 314 for the data collector 302. The certificate request 314 can be triggered upon startup of the machine learning system 306, for example. In response, the operating system 304 sends the machine learning system 306 a public key 316 of the data collector 302.

The data collector 302 periodically collects hardware and/or software usage data associated with the device, as indicated by block 318.

In some embodiments, the hardware usage data can comprise readings from one or more hardware components of the device. The hardware readings can comprise a set of metrics for at least some of the hardware components. For example, the set of metrics can correspond to temperature, voltage, fan speed, battery power, and/or any other types of metrics relevant to the machine learning system 306. In one example, the software and/or hardware usage data can be obtained from readings residing in a file system of the operating system 304 (e.g., /proc in Linux, or register table entries in Windows).

In some examples, the hardware readings can be read from input-output registers by interacting with the device drivers of the respective hardware components. The software usage data, for example, can be collected from the operating system kernel data structures (e.g., a Windows Kernel Data Structure), or from an operating system kernel application programming interface (API) (e.g., Windows Kernel API). The software usage data may comprise a set of metrics corresponding to: memory and/or disk space, processor load, network input-output operations, network latency, and/or other types of software usage metrics relevant to the machine learning system 306.

The data collector 302 sends the collected data 320 to the machine learning system 306. As an example, the data collector 302 can create a message by concatenating the collected software and/or hardware usage data. In some embodiments, the message can also include a timestamp corresponding to the message. The data collector 302 can generate a message authentication code (MAC) for the message and sign the message with its private key 312. In some embodiments, the collected data 320 is sent as a message via a kernel-user space communication mechanism (e.g., Windows Message Mailbox).

In response to receiving the collected data 320, the machine learning system 306 verifies the collected data 320 based at least on the public key 316 of the data collector 302, as indicated by block 322. For example, the machine learning system 306 can check, using the public key 316, that the collected data 320 is signed by the data collector 302. If the collected data 320 is sent as a message with a timestamp and a MAC, then the machine learning system 306 can also verify that the MAC code is correct (based on the message contents) and that the timestamp is valid (e.g., based on whether it was received within a specified time period corresponding to the timestamp). If the collected data is verified, then the data is considered trusted and can be used as an input to the machine learning system 306. Otherwise, the collected data 320 can be discarded, for example.

Some embodiments are described herein with reference to particular operating systems and types of machine learning models, however, this is not intended to limiting. Such embodiments are also applicable to other operating systems (e.g., mobile operating systems, Unix, and/or Unix-like operating systems) and/or other types of machine learning models (e.g., machine learning models for computer vision, self-driving vehicles, image classification, network intrusion detection etc.).

Figure 4:
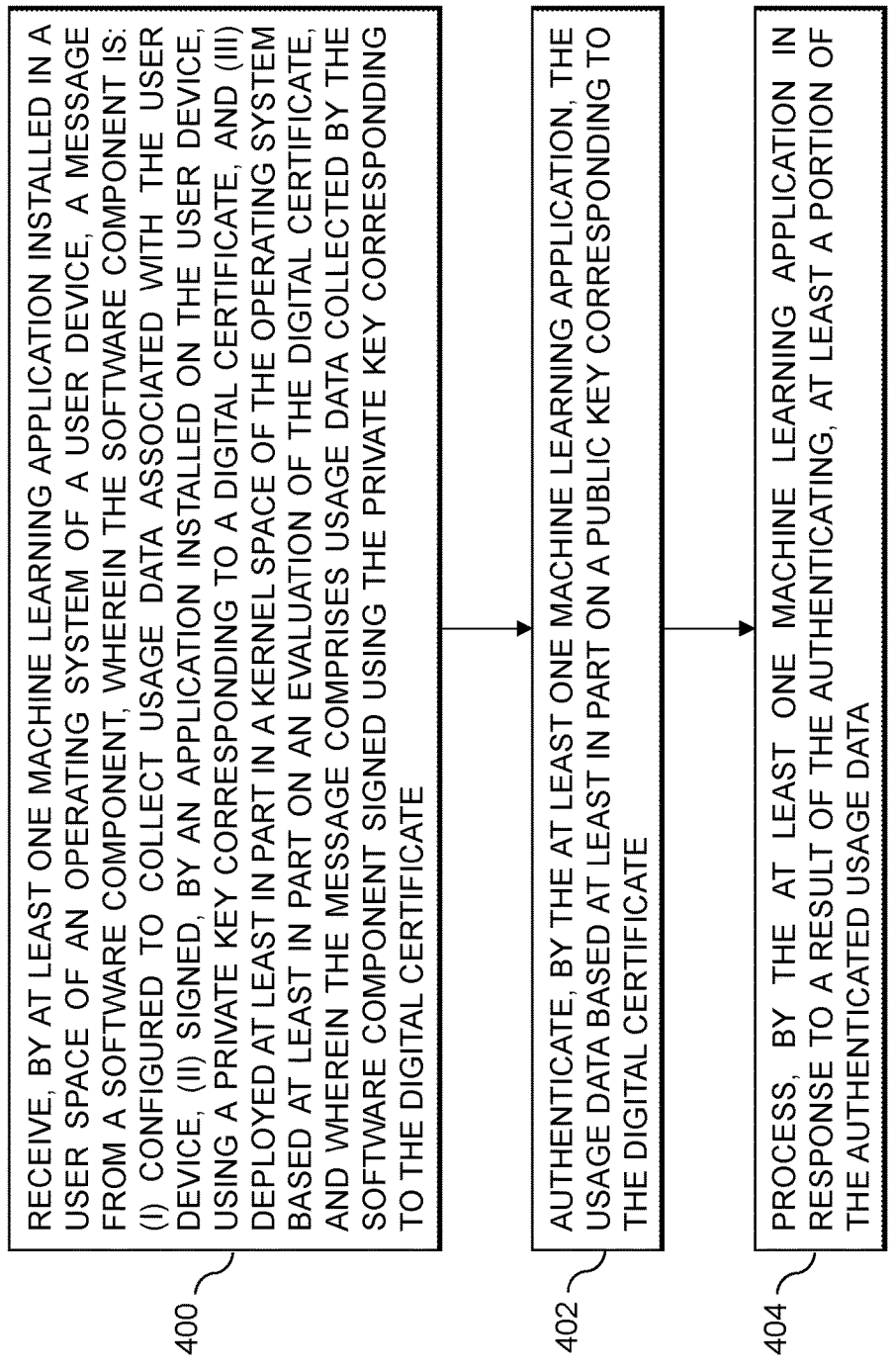
FIG. 4 shows a flow diagram of a process for authenticating usage data for processing by machine learning models in an illustrative embodiment.

FIG. 4 is a flow diagram of a process for authenticating usage data for processing by machine learning models in an illustrative embodiment. It is to be understood that this particular process is only an example, and additional or alternative processes can be carried out in other embodiments.

In this embodiment, the process includes steps 400 through 404. These steps are assumed to be performed by the user device 102-1 utilizing at least a portion of its elements 112, 114, 116, and 118.

Step 400 includes receiving, by at least one machine learning application installed in a user space of an operating system of a user device, a message from a software component, wherein the software component is: (i) configured to collect usage data associated with the user device, (ii) signed, by an application installed on the user device, using a private key corresponding to a digital certificate, and (iii) deployed at least in part in a kernel space of the operating system based at least in part on an evaluation of the digital certificate, and wherein the message comprises usage data collected by the software component signed using the private key corresponding to the digital certificate.

Step 402 includes authenticating, by the at least one machine learning application, the usage data based at least in part on a public key corresponding to the digital certificate.

Step 404 includes processing, by the at least one machine learning application in response to a result of the authenticating, at least a portion of the authenticated usage data.

The authenticating may be based at least in part on at least one of: one or more timestamps associated with the message and a message authentication code associated with the message. The message may be sent using a kernel-user space communication. The software component may be deployed as a virtual device driver in the kernel space. The usage data may include at least one of: hardware usage data collected from one or more input-output registers associated with one or more hardware devices; and software usage data collected from at least one of: one or more data structures corresponding to the kernel space and one or more application programming interfaces corresponding to the kernel space. The digital certificate may be stored in a certificate database of the operating system. The public key may be obtained from the operating system. The process may include a step of initiating one or more automated adjustments to one or more settings associated with the user device based on one or more outputs that are generated by the processing the at least the portion of the authenticated usage data. The application may be preinstalled on the user device with the digital certificate.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to prevent adversarial example attacks on machine learning systems. These and other embodiments can effectively overcome problems associated with conventional approaches that, for example, rely on software detectors to identify adversarial examples. For example, some embodiments are configured to authenticate input data for machine learning models as well as software components that collect the input data to prevent adversarial examples from being processed by a machine learning system. These and other embodiments can effectively improve the security of machine learning systems relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
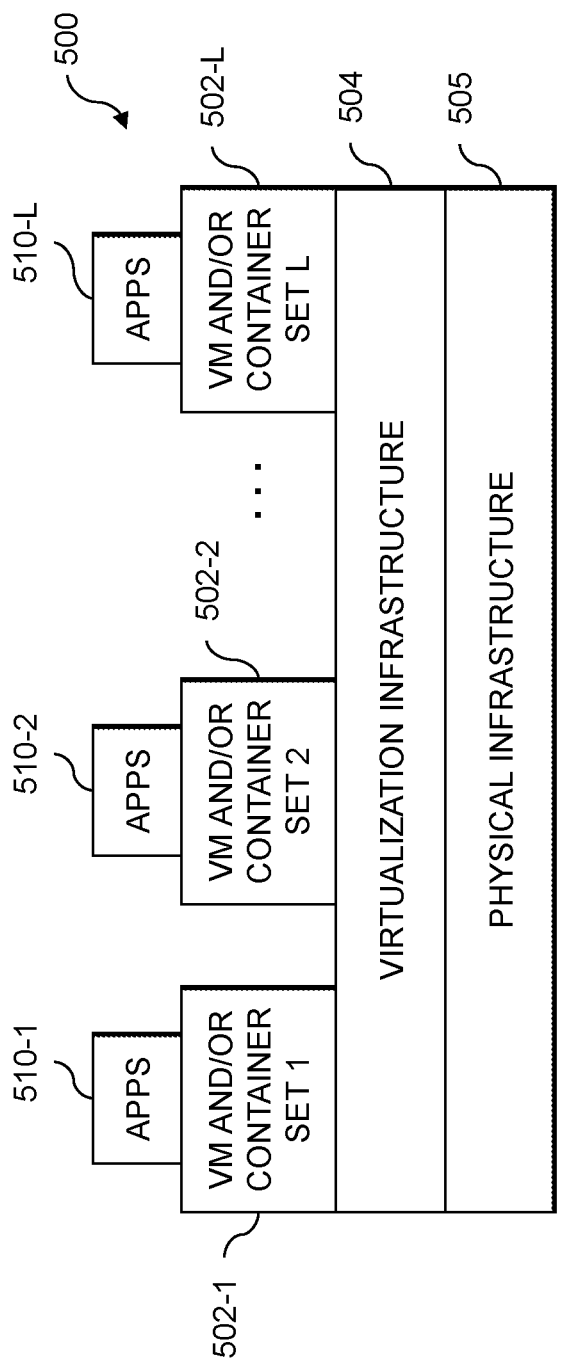
FIGS. 5 and 6 show examples of processing platforms that may be utilized to implement at least a portion of an information processing system in illustrative embodiments.
Figure 6:
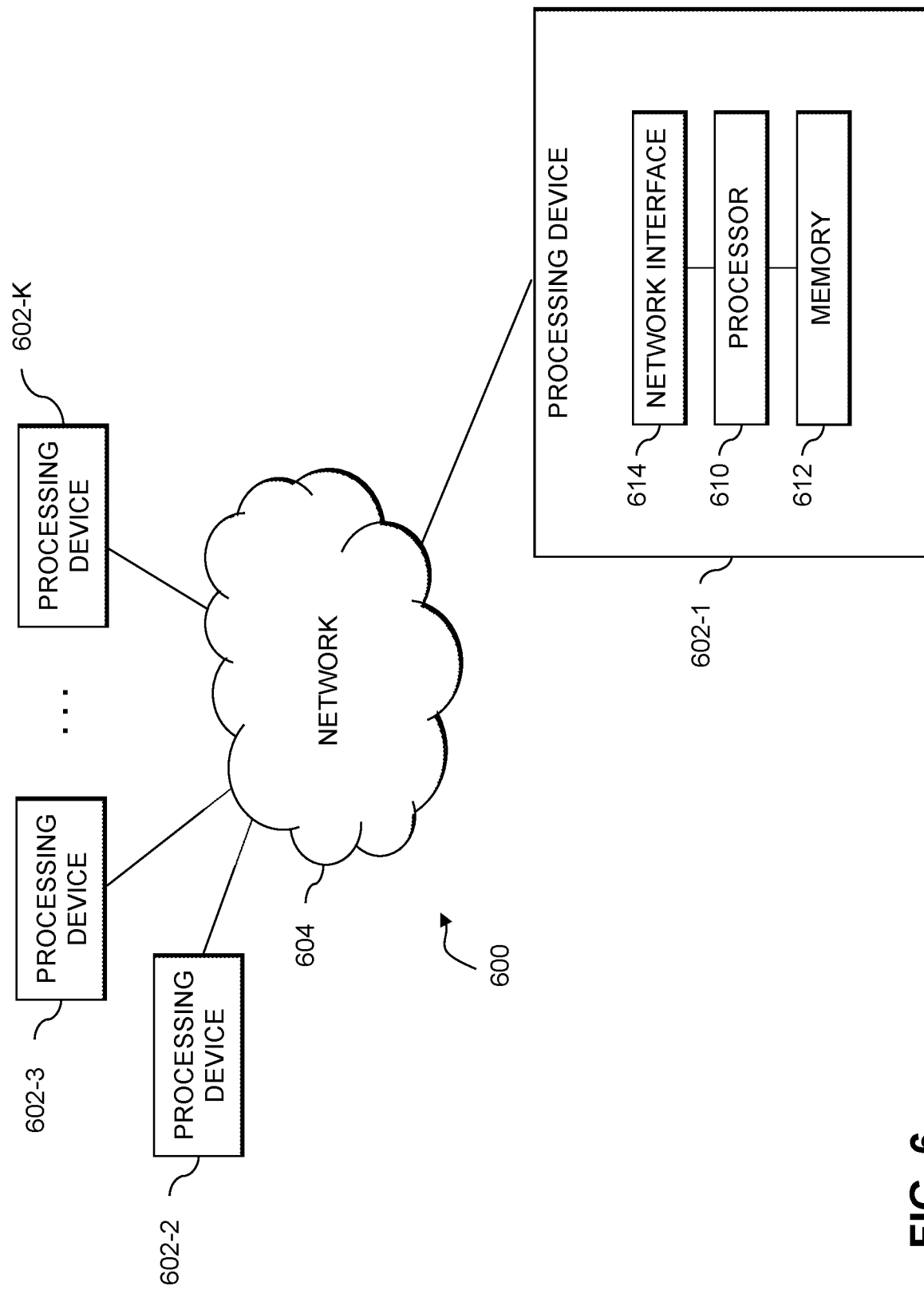

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, an FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    receiving, by at least one machine learning application installed in a user space of an operating system of a user device, a message from a software component, wherein the software component is: (i) configured to collect usage data associated with the user device, (ii) signed, by an application installed on the user device, using a private key corresponding to a digital certificate, and (iii) deployed in a kernel space of the operating system based at least in part on an evaluation of the digital certificate, and wherein the message comprises usage data collected by the software component signed using the private key corresponding to the digital certificate;
    authenticating, by the at least one machine learning application, the usage data based at least in part on a public key corresponding to the digital certificate; and
    processing, by the at least one machine learning application in response to a result of the authenticating, at least a portion of the authenticated usage data;
    wherein the method is performed by at least one processing device comprising a processor coupled to a memory.

2. The computer-implemented method of claim 1, wherein the authenticating is based at least in part on at least one of: one or more timestamps associated with the message and a message authentication code associated with the message.

3. The computer-implemented method of claim 1, wherein the message is sent using a kernel-user space communication.

4. The computer-implemented method of claim 1, wherein the software component is deployed as a virtual device driver in the kernel space.

5. The computer-implemented method of claim 1, wherein the usage data comprises at least one of:
    hardware usage data collected from one or more input-output registers associated with one or more hardware devices; and
    software usage data collected from at least one of: one or more data structures corresponding to the kernel space and one or more application programming interfaces corresponding to the kernel space.

6. The computer-implemented method of claim 1, wherein the digital certificate is stored in a certificate database of the operating system.

7. The computer-implemented method of claim 1, wherein the public key is obtained from the operating system.

8. The computer-implemented method of claim 1, comprising:
    initiating one or more automated adjustments to one or more settings associated with the user device based on one or more outputs that are generated by the processing the at least the portion of the authenticated usage data.

9. The computer-implemented method of claim 1, wherein the digital certificate comprises a root certificate, and wherein the application is preinstalled on the user device with the root certificate.

10. A non-transitory processor-readable storage medium having stored therein program code of one or more software programs, wherein the program code when executed by at least one processing device causes the at least one processing device:
    to receive, by at least one machine learning application installed in a user space of an operating system of a user device, a message from a software component, wherein the software component is: (i) configured to collect usage data associated with the user device, (ii) signed, by an application installed on the user device, using a private key corresponding to a digital certificate, and (iii) deployed in a kernel space of the operating system based at least in part on an evaluation of the digital certificate, and wherein the message comprises usage data collected by the software component signed using the private key corresponding to the digital certificate;
    to authenticate, by the at least one machine learning application, the usage data based at least in part on a public key corresponding to the digital certificate; and
    to process, by the at least one machine learning application in response to a result of the authenticating, at least a portion of the authenticated usage data.

11. The non-transitory processor-readable storage medium of claim 10, wherein the authenticating is based at least in part on at least one of: one or more timestamps associated with the message and a message authentication code associated with the message.

12. The non-transitory processor-readable storage medium of claim 10, wherein the message is sent using a kernel-user space communication.

13. The non-transitory processor-readable storage medium of claim 10, wherein the software component is deployed as a virtual device driver in the kernel space.

14. The non-transitory processor-readable storage medium of claim 10, wherein the usage data comprises at least one of:
hardware usage data collected from one or more input-output registers associated with one or more hardware devices; and
software usage data collected from at least one of: one or more data structures corresponding to the kernel space and one or more application programming interfaces corresponding to the kernel space.

15. The non-transitory processor-readable storage medium of claim 10, wherein the digital certificate is stored in a certificate database of the operating system.

16. An apparatus comprising:
at least one processing device comprising a processor coupled to a memory;
the at least one processing device being configured:
to receive, by at least one machine learning application installed in a user space of an operating system of a user device, a message from a software component, wherein the software component is: (i) configured to collect usage data associated with the user device, (ii) signed, by an application installed on the user device, using a private key corresponding to a digital certificate, and (iii) deployed in a kernel space of the operating system based at least in part on an evaluation of the digital certificate, and wherein the message comprises usage data collected by the software component signed using the private key corresponding to the digital certificate;
to authenticate, by the at least one machine learning application, the usage data based at least in part on a public key corresponding to the digital certificate; and
to process, by the at least one machine learning application in response to a result of the authenticating, at least a portion of the authenticated usage data.

17. The apparatus of claim 16, wherein the authenticating is based at least in part on at least one of: one or more timestamps associated with the message and a message authentication code associated with the message.

18. The apparatus of claim 16, wherein the message is sent using a kernel-user space communication.

19. The apparatus of claim 16, wherein the software component is deployed as a virtual device driver in the kernel space.

20. The apparatus of claim 16, wherein the usage data comprises at least one of:
hardware usage data collected from one or more input-output registers associated with one or more hardware devices; and
software usage data collected from at least one of: one or more data structures corresponding to the kernel space and one or more application programming interfaces corresponding to the kernel space.

* * * * *